United States Patent [19]

Matthias et al.

[11] Patent Number: 4,507,000
[45] Date of Patent: Mar. 26, 1985

[54] CHARACTER PRINT WHEEL WITH DRIVE ELEMENTS

[75] Inventors: Dan W. Matthias, Downingtown, Pa.; Richard D. Thornton, Concord, Mass.

[73] Assignee: Exxon Research and Engineering Co., Florham Park, N.J.

[21] Appl. No.: 534,933

[22] Filed: Sep. 23, 1983

Related U.S. Application Data

[63] Continuation of Ser. No. 21,769, Mar. 19, 1979, abandoned, which is a continuation of Ser. No. 809,923, Jun. 24, 1977, abandoned.

[51] Int. Cl.³ ............................................. B41J 1/30
[52] U.S. Cl. ........................... 400/144.2; 310/49 R; 310/66; 310/268; 400/175
[58] Field of Search ............ 310/49 R, 66, 268; 400/144.2–144.4, 175

[56] References Cited

U.S. PATENT DOCUMENTS

| | | | |
|---|---|---|---|
| 2,454,519 | 11/1948 | McNaney | 310/49 R |
| 2,683,230 | 7/1954 | Mickelson | 310/49 R |
| 2,765,433 | 10/1956 | Lilienstein | 310/49 R |
| 3,392,293 | 7/1968 | De Boo et al. | 310/49 R |
| 4,139,790 | 2/1979 | Steen | 310/156 |
| 4,339,679 | 7/1982 | Urschel | 310/49 R |

*Primary Examiner*—Paul T. Sewell

[57] ABSTRACT

A print wheel comprising a plurality of character elements for use in a serial impact printer such as a typewriter is directly attached to a rotor of a high performance rotary stepper motor. The rotor which is characterized by a high force-to-mass ratio includes a plurality of circumferentially spaced magnetic drive elements which are integrally formed with the rotor hub which also supports the print wheel. In one embodiment, the stator of the rotary motor forms an axial air gap between an active stator portion and an inactive stator portion, and the rotor and print wheel are removably mounted in the air gap. In another embodiment, the stator of the rotary motor forms a radial air gap between the active stator portion and the inactive stator portion.

8 Claims, 10 Drawing Figures

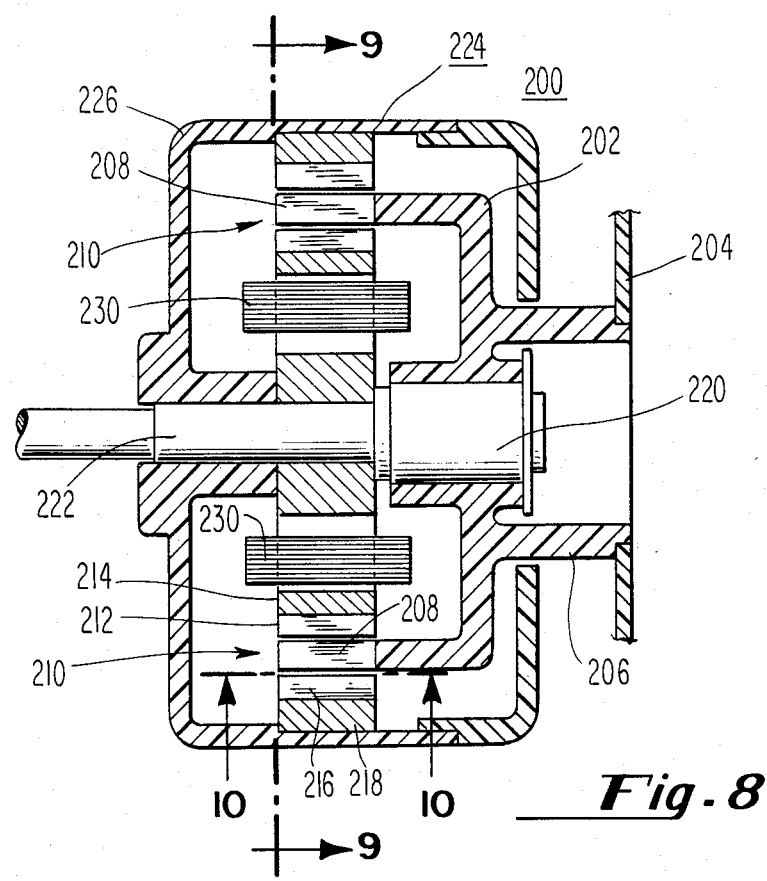
Fig. 8
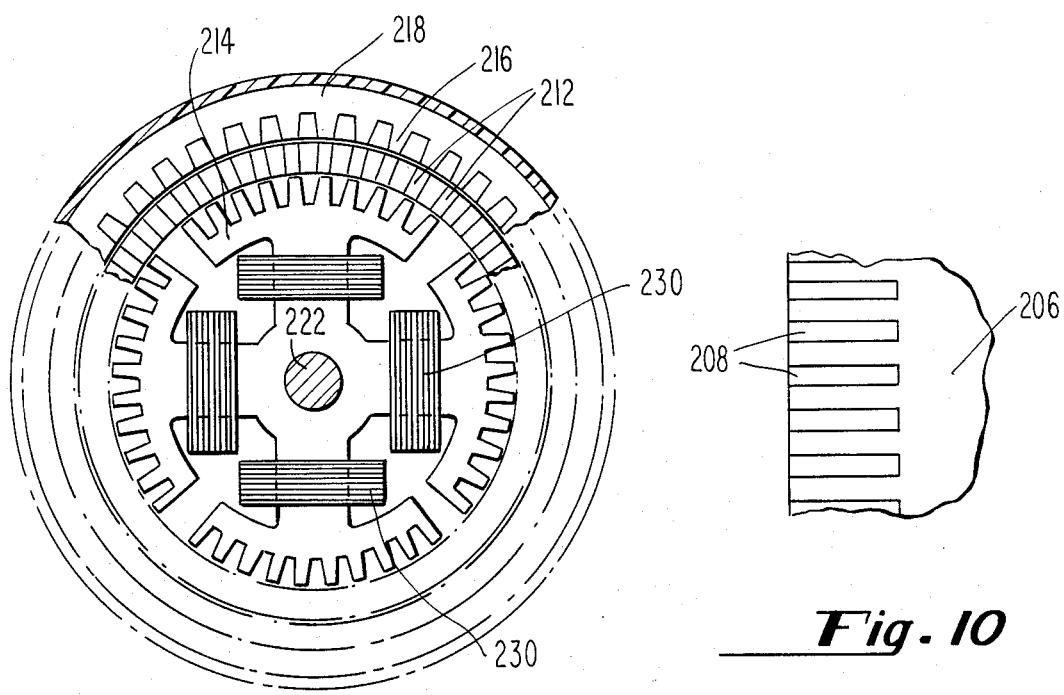
Fig. 9
Fig. 10

CHARACTER PRINT WHEEL WITH DRIVE ELEMENTS

This is a continuation of application Ser. No. 21,769, filed Mar. 19, 1979 (abandoned with the filing of this application) which, in turn, was a continuation of application Ser. No. 809,923, filed June 24, 1977 (now abandoned).

BACKGROUND OF THE INVENTION

This invention relates to serial impact printers and, more particularly, to serial impact printers employing rotatable character arrays such as a print wheel or daisy.

A print wheel of the daisy type, as shown in U.S. Pat. No. 3,949,853—Lahr et al, comprises a central hub portion which is removably coupled to the drive mechanism for the print wheel and a plurality of petals or radially-extending spokes which carry the various character elements at the radial extremities thereof in circumferentially spaced positions about the print wheel. Print wheels or daisies of this type may be utilized in a variety of applications. For example, print wheels may be used in serial printers such as those manufactured by Qume and Diablo, which are associated with communications terminals, computer output devices and other printing applications in the data processing field. In addition, such print wheels may be and are utilized in typewriters including equipment manufactured by Xerox Corp.

One important consideration in mounting a print wheel of the daisy-type is the manner in which the print wheel may be removed from the rotary drive mechanism. Removability and/or replacement of the print wheels is particularly important since the print wheels are subjected to a substantial battering force by the hammer. In addition, it is desirable, particularly in typewriter applications, to permit removability or replacement of the print wheel so as to allow for selection of a particular style of type by merely changing print wheels.

Replacement or removability of print wheels has been achieved in the Xerox typewriters which employ daisies by hinging the print wheel carriage so as to allow the print wheel and drive to be moved upwardly and away from the opposing platen. Once moved to this position, the print wheel may be extracted by pulling the print wheel from the end of the drive shaft since the platen is no longer in a position of interference with respect to that drive shaft. See also U.S. Pat. No. 3,707,214—Ponzano. Replacement of the daisy has also been achieved by hinging the printing hammer as shown in U.S. Pat. No. 3,651,916—Bacchi, so as to allow the daisy to be removed from the drive shaft.

As indicated above, the print wheels of the prior art have been driven by means of drive shafts coupled to a suitable drive which may include a stepper motor as shown in the aforesaid Ponzano patent. Magnetic elements have been proposed for use in print wheels, as shown in U.S. Pat. No. 3,842,960—Gerry, for purposes of determining the print wheel position, but the magnetic elements are not utilized to drive the print wheel.

Another important consideration in print wheels and the associated drive is the achievement of a high performance level. In this connection, it will be apprecitaed that the characters must be moved rapidly to the impact printing position if a high serial printing rate is to be achieved. This becomes particularly important in data processing printers and typewriters which are capable of operating in a memory mode. For similar reasons, it is particularly important to minimize the mass of the print wheel drive where the drive and the print wheel are mounted on a movable carriage so as to assure rapid movement along the platen.

SUMMARY OF THE INVENTION it is an object of this invention to provide an improved drive for a rotatable character array.

It is a further object of this invention to provide for ease in removability and replacement of a rotatable character array.

It is a further object to provide a rotatable stepper motor having a removable rotor.

In accordance with these objects, a rotatable character array includes a plurality of character elements located at a plurality of circumferentially spaced print positions radially displaced with respect to the axis of rotation. A drive apparatus for the array comprises a rotary motor including a stator and a rotor. In accordance with this invention, the rotor is attached directly to the character array rather than being coupled through a drive shaft.

In the preferred embodiments of the invention, the motor is of the stepper type and the stator comprises a plurality of circumferentially spaced stator elements comprising magnetic material and energizing means for selectively energizing the magnetic stator elements. The rotor of the stepper motor includes a plurality of circumferentially spaced rotor elements comprising magnetic material radially displaced from the axis of rotation and juxtaposed and spaced from the magnetic stator elements. The rotor elements are adapted to close various flux paths between the stator elements in response to selective energization of the stator elements by the energizing means.

In the preferred embodiments of the invention, the rotor elements are integrally formed with a rotor hub portion (i.e., not intended to be separable) and the character array is carried by the hub portion. The character array may also be integrally formed with the hub portion or may be separable therefrom.

In one preferred embodiment of the invention, the stator comprises a first stator portion and a second stator portion axially displaced with respect to the first stator portion so as to form an axial air gap for receiving the rotor. The rotor comprises a hub portion, rotor elements in the form of magnetic inserts in the hub portion, and a plurality of spokes extending radially outwardly from the hub portion with character elements located at the ends of the spokes. In order to provide for removability of the print wheel from this axial air gap, the axial thickness of the character elements does not exceed the thickness of the hub portion including the inserts, and the character elements are substantially coaxial with the inserts.

In another preferred embodiment of the invention, the first portion and the second portion of the stator form a radial air gap. The rotor again comprises a hub portion and rotor elements in the form of magnetic inserts. However, the character array which comprises a removable print wheel with spokes and character elements is freely separable from the hub portion.

In accordance with another important aspect of the invention, the rotary stepper motor which drives the character array is characterized by high performance, light weight and important topological advantages in printer applications. In this connection, a high force-to-mass ratio for the rotor is achieved by assuring that all rotor elements are always located between stator elements and substantially or completely eliminating any longitudinal flux between rotor elements. This allows the energizing means of the stepper motor stator to actively excite a stator portion on only one side of the air gap without sacrificing performance. Such a structure is particularly important in a typewriter or other printer utilizing a platen since, with an axial air gap motor, the second stator portion without the energizing means may be juxtaposed to the platen so as to facilitate the impact printing relationship between the print wheel in the axial air gap and the platen which carries or backs the print receiving medium. Similarly, with a radial air gap, the elimination of the energizing means on one side of the air gap provides greater accessibility to the print wheel.

In order to provide for removability of the print wheel in the axial air gap embodiment, the drive apparatus comprises a support shaft for the rotor and print wheel. The shaft is retractable so as to permit removal and replacement of the rotor and print wheel, and the print wheel includes a central opening which cooperates with a chamfered surface on the shaft for centering the print wheel upon insertion into the air gap of the stator.

BRIEF DESCRIPTION OF THE DRAWINGS

FIG. 8 is a sectional view of another embodiment of the invention including a print wheel mounted on the rotor hub of a radial air gap stepper motor;

FIG. 9 is a sectional view taken along line 9—9 of FIG. 8; and

FIG. 10 is an enlarged view of a portion of the rotor surface shown in FIG. 9.

DETAILED DESCRIPTION OF A PREFERRED EMBODIMENT

Figure 1:
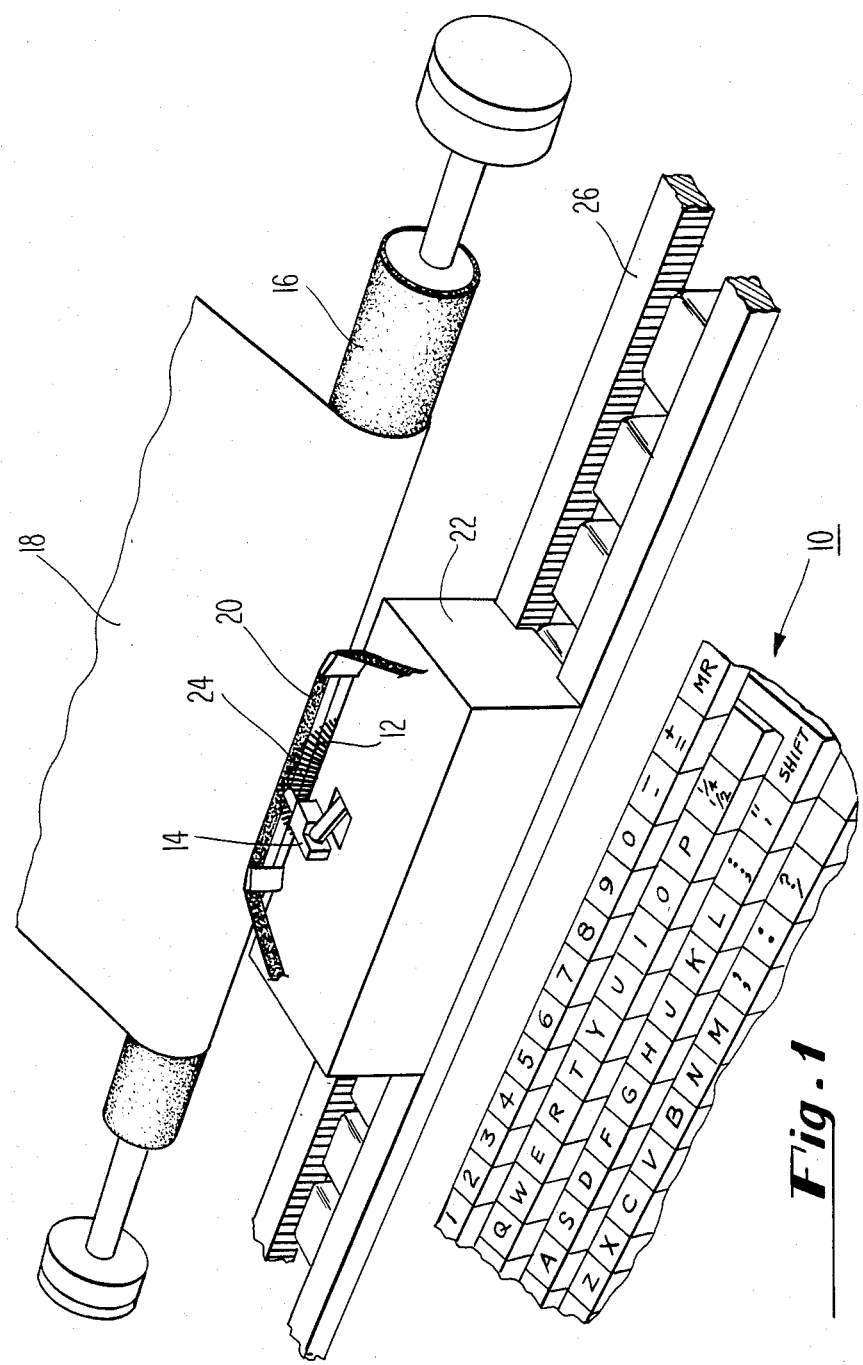
FIG. 1 is a perspective view of a typewriter embodying the invention.

A typewriter shown in FIG. 1 comprises a keyboard 10 which includes a multiplicity of keys corresponding to various characters which, upon depression, control the position of a rotatable character array in the form of a print wheel 12 juxtaposed between impact means in the form of a hammer 14 and a platen 16. The platen 16 is adapted to support a print receiving medium in the form of paper 18 which is contacted by a marking medium in the form of an ink ribbon 20 which is located between the print wheel 12 and the paper 18 so as to leave a mark in ink corresponding to the particular character of the print wheel which is in position between the hammer 14 and the paper 18.

As shown in FIG. 1, the print wheel 12 and the hammer 14 are mounted on a carriage 22 which is adapted to move in a direction parallel with the surface of the platen 16 so as to position the print wheel 12 at various positions along the paper 18 in response to the depression of keys on the keyboard 10. As the carriage 22 is moved, the print wheel 12 rotates so as to position the proper character element which is located at the end of radially extending spokes 24 in the printing position aligned with the print hammer 14. The linear movement of the carriage 22 along support surfaces 26 may be achieved by various means known in the art.

Figure 2:
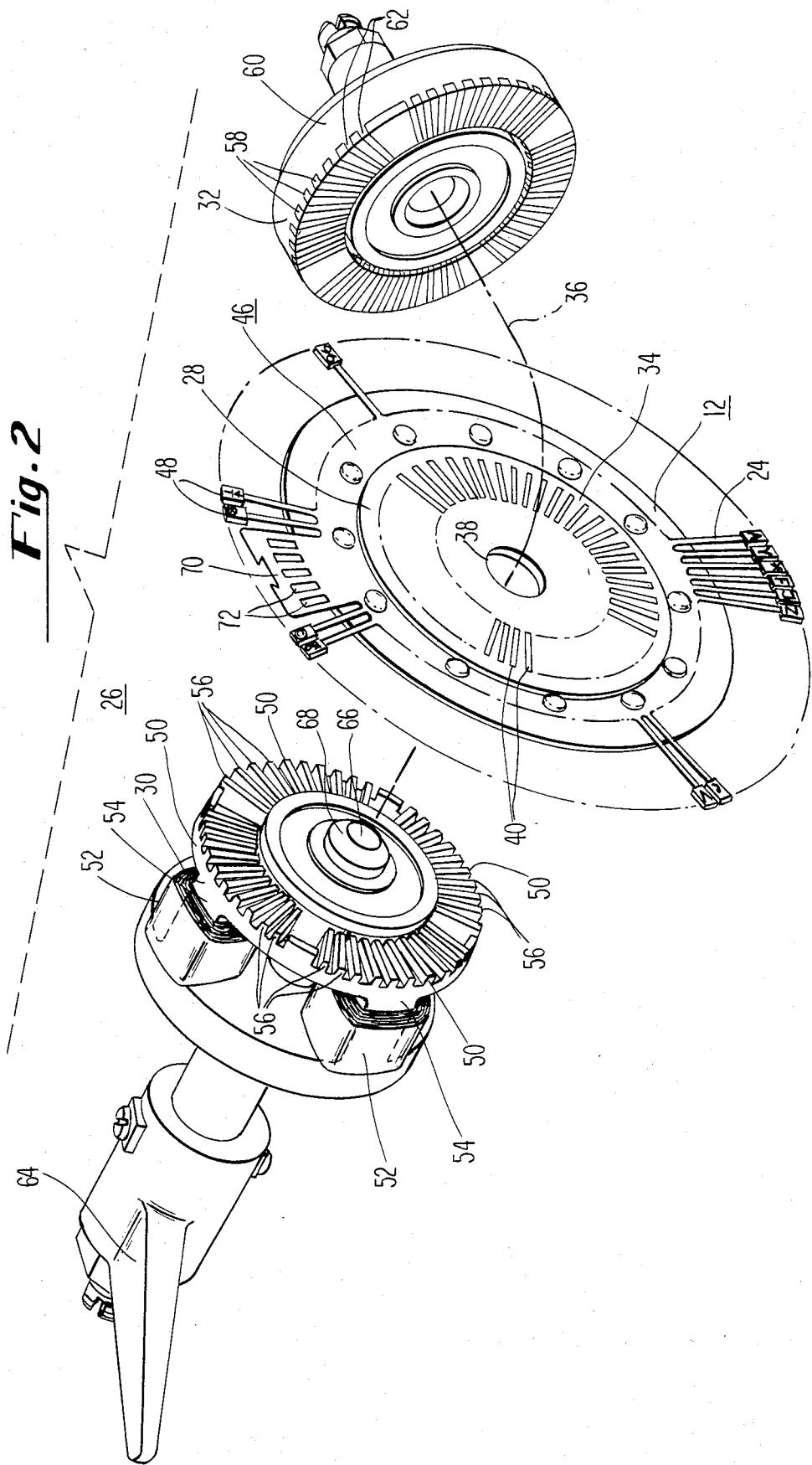
FIG. 2 is a perspective view of a print wheel constructed in accordance with the invention which is mounted in the axial air gap of a rotary stepper motor which has been exploded for purposes of explanation.
Figure 3:
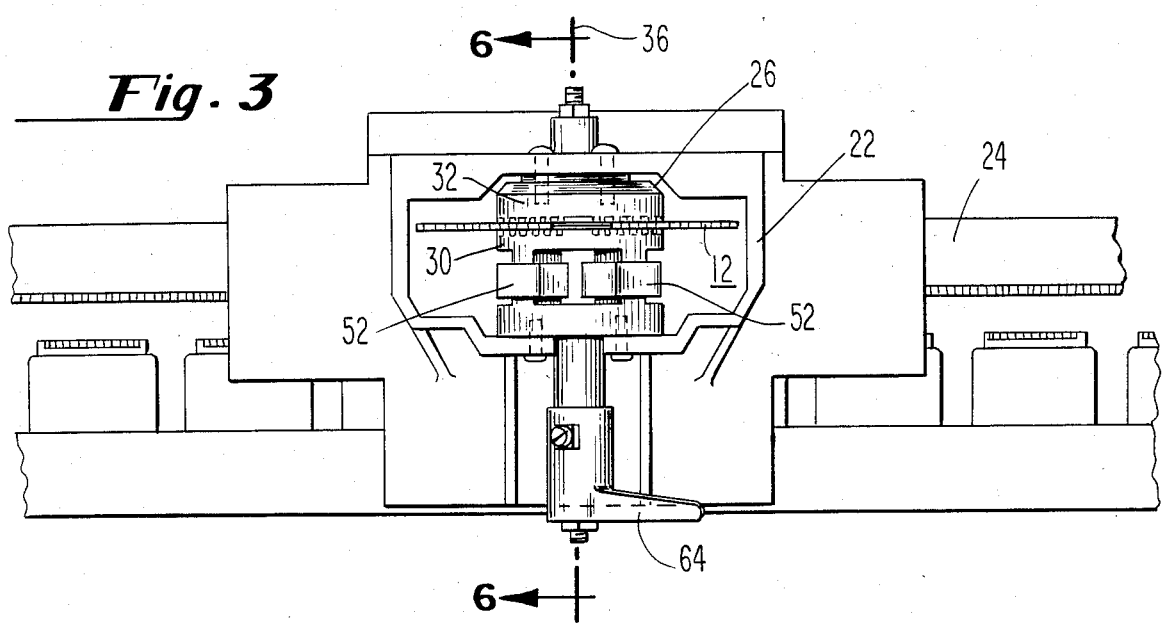
FIG. 3 is a top plan view of the carriage in the typewriter of FIG. 1 with the cover of the carriage removed.
Figure 4:
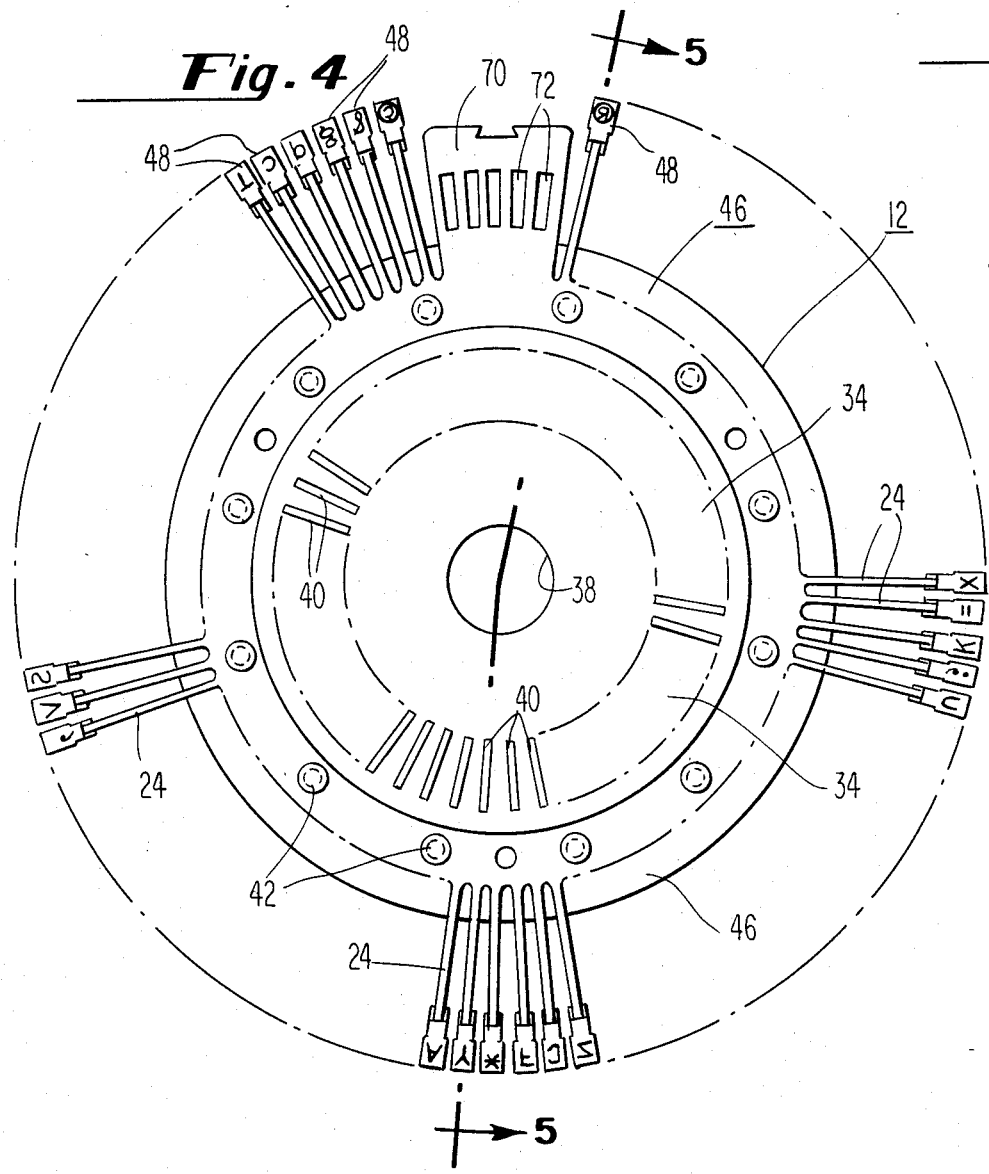
FIG. 4 is an elevational view of the print wheel shown in FIG. 2.

Reference will now be made to FIGS. 2 and 3 wherein a very important aspect of the invention is shown in detail. More specifically, FIGS. 2 and 3 show a variable reluctance, rotary stepper motor 26 which comprises a rotor 28 integrally formed with the print wheel 12 and a stator comprising a first excited stator portion 30 and a second unexcited stator portion 32. As best shown in FIG. 2 as supplemented with FIGS. 4 and 5, the combination print wheel 12/rotor 28 comprises a central hub portion 34 which is adapted to be supported by a shaft extending along the axis 36 of the rotary stepper motor and through a central opening 38 in the hub 34.

Figure 5:
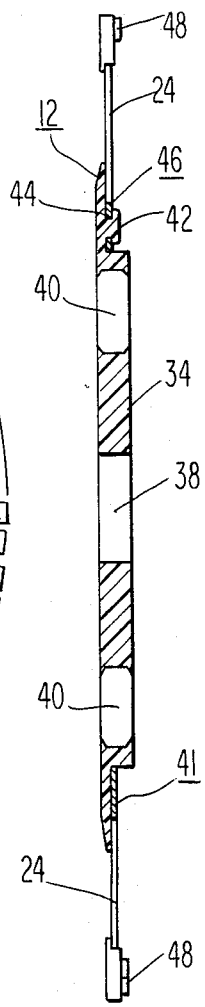
FIG. 5 is a sectional view through the print wheel of FIG. 4 taken along line 5—5.

In the preferred embodiment of the invention, the rotor elements or teeth of the stepper motor rotor are integrally formed with the hub 34 by means of rotor inserts or slugs 40 which are circumferentially spaced about the hub 34 and radially outwardly spaced from the central opening 38. A wheel portion 46 of the print wheel 12 is then integrally attached to the periphery of the hub 34 by means of rivets 42 which are best shown in FIG. 5 so as to directly connect the rotor 28 to the print wheel 12. In this connection, the wheel portion 46 comprises a plurality of openings 44 for receiving the rivets 42 at circumferentially spaced locations with the spokes 24 of the wheel portion 46 extending radially outwardly beyond the openings 44. Character elements 48 are then attached at the ends of the spokes 24 in the various circumferentially spaced positions about the print wheel so as to be substantially coaxial with the rotor elements 40. By integrating the print wheel and the rotor and eliminating any drive shaft therebetween, the total mass of the rotating structure is reduced so as to achieve the desired high performance.

In order to further limit the mass and of the print wheel 12/rotor 28, the rotor hub 34 may comprise a material such as plastic in which the heavier (i.e., more dense) magnetic slugs 40 are inserted. This further improves the performance of the print wheel drive and minimizes the longitudinal flux leakage between the magnetic slugs 40.

As shown in FIGS. 2 and 3, the rotary stepper motor 26 is of the axial air gap type and the print wheel 12 is adapted to be received in the axial air gap. When the print wheel 12 is located within the axial air gap, the rotor elements 40, which comprise magnetic material, close the flux paths across the air gap from the first stator 30 to the second stator portion 32.

The first stator portion 30 comprises a plurality of pole positions 50, e.g., four, which are individually excited by a plurality of windings 52 which are wrapped around axially extending portions 54 of the stator portion 30. Each of the pole positions 50 comprises a plurality of stator elements in the form of teeth 56 where the teeth 56 at one of the pole positions 50 may be aligned with certain rotor elements 40 of the print wheel 12 while the remainder of the teeth 56 are in a state of misalignment with the other rotor elements 40. When the print wheel 12 advances or steps to the next position, the teeth of another pole position 50 will be aligned with certain of the rotor elements 40, and teeth 56 at the other pole positions will be in a state of misalignment with the other rotor elements 40.

The stator portion 32 includes teeth or rotor elements 58 at four pole positions which are precisely aligned with the teeth or stator elements 56 of the stator portion 30. However, unlike the first stator portion 30, the second stator portion 32 is unexcited and merely serves to close the flux path to permit flux to pass through the magnetic portion 60 of the stator and back across the axial air gap to the first stator portion 30 by means of the teeth 58 and the teeth 56 of another pole position 50. By limiting the heavy energizing means to only one side of the air gap, the overall weight of the stepper motor 26 is reduced so as to further enhance the performance of the printer as the carriage 22 of FIG. 1 moves linearly along the platen 16. As shown in FIG. 2, the teeth 56 of the first stator portion 30 are separated by air gaps whereas the teeth 58 of the second stator portion 32 are separated by solid non-magnetic material 62 which may also be relatively light, e.g., plastic, so as to minimize the weight of the stepper motor.

In the foregoing, great emphasis has been placed on the high performance of the stepper motor 26 and its reduced weight so as to achieve a rapid serial printing rate. In this connection, a novel stepper motor design has been disclosed which achieves high performance even though the stator is actively excited on only one side of the air gap. This specific stepper motor design forms the invention of copending application Ser. No. 809,646 filed June 24, 1977. This application describes the importance of maintaining the rotor elements 40 between the stator elements 50 and 62 at all times, the importance of maintaining rotor element symmetry with respect to both sides of the air gaps as well as the importance of limiting longitudinal flux between the rotor elements. For this reason, the description of the stepper motors disclosed in the aforesaid application is incorporated herein by reference as if set forth in full.

In accordance with another important aspect of the invention, the combination print wheel 12 including the rotor elements 40 is readily removable from the carriage 22 without requiring the hinging or displacement of the carriage 22. In this connection, a lever 64 is provided which is coupled to the support shaft 66 of the axial air gap motor 26, a portion of which is shown in FIG. 2. As the lever 64 is rotated in one direction, the shaft is retracted from the opening 38 in the hub 34 of the print wheel to permit the print wheel to be removed from the axial air gap and a different print wheel to be inserted. In this connection, the print wheel 12 comprises a flag 70 which is adapted to be gripped between the fingers so as to permit removal of the print wheel 18. The flag includes windows 72 which correspond, in circumferential dimensions and spacing, to the spokes 24 so as to permit continuous optical sensing of the incremental rotation of the wheel 18 as driven by the stepper motor. Of course, such sensing provides information as to the exact location of a particular character element 48 with respect to the hammer 14.

Figures 6, 7:
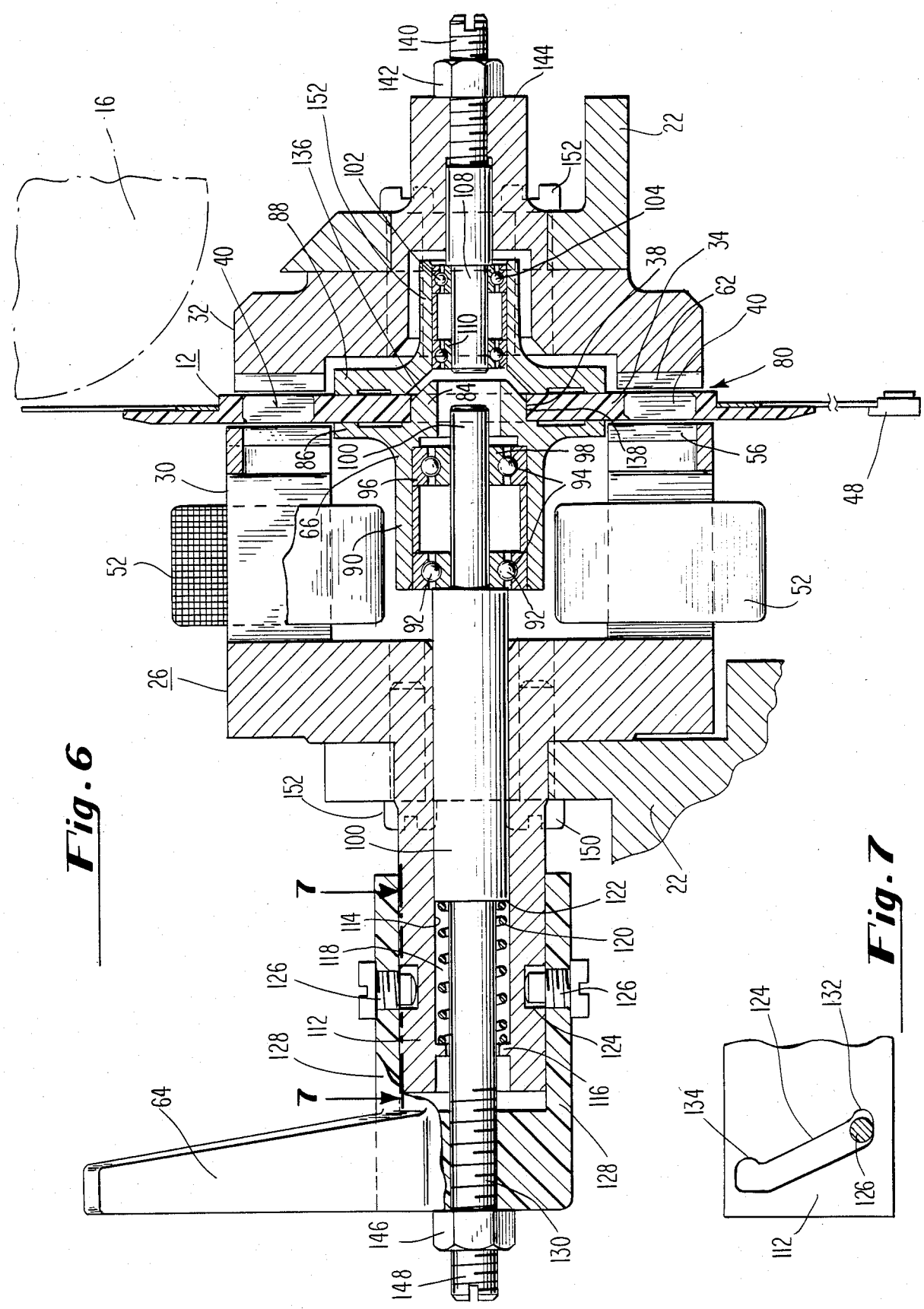
FIG. 6 is a sectional view of the carriage shown in FIG. 3 taken along line 6—6.
FIG. 7 is a sectional view of a cam in the carriage shown in FIG. 6 taken along line 7—7.

Reference will now be made to FIG. 6 for a more complete description of the removable nature of the print wheel 12 and the function of the lever 64.

As shown in FIG. 6 and previously described with respect to other Figures, the print wheel 12 is mounted in an axial air gap 80 between the stator portion 30 and the stator portion 32. The retractable support shaft 66 which supports the wheel 12 includes a central support portion 84 which is adapted to be received by the opening 38 in the hub 34 and a radially outwardly spaced clamping flange 86 which is adapted to contact the hub 34 adjacent the rotor elements 40. The clamping flange 86 cooperates with a rotatable clamping member 88 located on the opposite side of the hub 34.

The shaft 66 includes a sleeve 90 which is rotatably supported by bearings 92 which are located in races 94 formed between a bearing surface 96 of the rotatable shaft 66 and a bearing surface 98 secured to a non-rotatable shaft 100 which extends to the lever 64. The rotatable clamping member 88 is similarly supported by bearings 102 which are located in races 104 within a sleeve 106. The non-rotatable shaft 108 extends into the sleeve 106 within the unexcited rotor portion 32 and carries a non-rotatable bearing surface 110 which, in part, forms the races 104.

In accordance with this invention, the support shaft 66 may be retracted by rotating the lever 64 counterclockwise thereby withdrawing the central support portion 84 of the shaft 66 from the opening 38 while at the same time releasing the clamp formed between the clamping portion 86 and the clamping member 88. Once the shaft 66 is retracted, the print wheel 12 may be readily removed by lifting the print wheel 12 out of the air gap 80 in a direction substantially perpendicular to the axis through the stepper motor 26.

Retraction of the shaft 66 as a result of the rotation of the lever 64 is achieved in the following manner. The shaft 100 extends into the bore 114 of a sleeve 112 which is rigidly secured to the carriage 22 as well as the stator portion 30 and the stator portion 32. The sleeve 112 includes a flange 116 which extends radially inwardly into the bore 114 so as to define a cylindrical opening 118 which receives a coiled spring 120 which is adapted to be compressed between the flange 116 and a shoulder 122 of the shaft 100. The sleeve 112 also includes cam grooves 124 which extend around and along the sleeve 112. One of the cam grooves 124 is shown in plan view in FIG. 7. Cam followers in the form of screws 126 which extend through a sleeve 128 of the lever 64 follow the contour of the grooves 124 as the lever 64 is rotated about a threaded portion 130 of the shaft 100.

With the lever 64 rotated to the position shown in FIG. 7 where the cam followers 126 are advanced to a land 132, the shaft 100 with the threaded portion 130 secured to the lever 64 is advanced to the position shown in FIG. 6 where the central support portion 84 is located within the opening 38 and the clamping portion 86 in contact with the hub 34. The clamping force for the clamping portion 86 is exerted by the compression spring 120. When the lever 64 is rotated in counterclockwise direction to a point where the cam follower 126 is located in a land 134, the lever 64 and the shaft 100 are retracted with the spring 120 being compressed so as to remove the central support portion 84 from the opening 38 and unclamp the clamp portion 86 from the hub portion 34.

In order to assist in locating the central support portion 84 in the opening 38 when replacing the print wheel 12, the central support portion 84 includes a chamfered surface 136. The chamfered surface 136 cooperates with the edge of the opening 38 so as to move the print wheel 12 into the proper location so that a cylindrical surface 138 may be inserted into the opening 38.

It will, of course, be understood that the axial air gap 80 is only slightly larger than the thickness of the hub portion 34 at the rotor elements 40. It is therefore imperative that the thickness of the hub portion 34 be carefully controlled. It is also important that the print wheel 12 with the hub portion 34 be properly located in the axial air gap 80. In this connection, it has been found that the optimum space between the unexcited stator portion 32 and the rotor elements 40 should be 80 to 85% of the space between the excited stator portion 30 and the rotor elements 40. It has also been found that a space of 0.003 to 0.005 inches on either side of the rotor elements 40 is desirable where the thickness of the hub portion 34 and the rotor elements 40 is 0.080 inch.

In order to carefully control the position of the print wheel 12 within the air gap 80 and the space between the rotor elements 40 and the stator portions 30 and 32, the shaft 108 includes a threaded portion 140 of the shaft 108 with a lock nut 142 threadedly secured to the threaded portion 140 and in contact with a surface 144 of the unexcited stator portion 32. By adjusting the position of the threaded portion 140 with respect to the surface 144 and locking the shaft 108 in that position by means of the lock nut 142, the space between the hub portion 34 with the rotor elements 40 and the teeth of the stator portion 32 may be carefully controlled. Of course, the space between the hub 34 and the teeth of the stator portion 30 is automatically controlled by the lock nut 142 subject to the overall width of the air gap 80 as determined by the spacing between the stator portion 30 and the stator portion 32 as positioned on the carriage 22 not shown.

A lock nut 146 is also provided for a threaded portion 148 of the shaft 100. However, the lock nut 146 merely secures the lever 64 in the position on the shaft 100 but is not utilized to control the space between the hub 34 and the excited stator portion 30.

In order to achieve removability and replacement of the print wheel 12, it is necessary to assure that the thickness of the character elements 48 does not exceed the thickness of the axial air gap 80 and does not therefore substantially exceed the thickness of the hub portion 34 including the rotor elements 40. Preferably, the thickness of the character elements is less than the thickness of the hub portion 34. It will therefore be appreciated that the print wheel 12 may be removed from the air gap 80 of the rotor without altering the dimensions of the air gap.

FIG. 6 also demonstrates the topological advantage of utilizing a rotary stepper motor wherein only one portion of the stator is excited. More particularly, it will be noted that platen 16 may be placed adjacent the stator portion 32 without concern that the platen 16 will in any way interfere with any windings.

FIG. 6 shows a portion of the carriage 22 which is attached to the stepper motor 26 by bolts 150 and 152. Of course, additional carriage structure is provided with the necessary clearance provided for the print wheel 12.

Reference will now be made to FIGS. 8–10 which disclose a variable reluctance rotary stepper motor 200 which also incorporates important aspects of this invention. More particularly, the stepper motor 200 comprises a rotor 202 which is directly connected to, without means of a drive shaft, an axially displaced character array in the form of a print wheel 204 which is removably attached to one end of a rotor hub portion 206.

In accordance with one important aspect of the invention, the rotor hub portion includes a plurality of circumferentially spaced rotor elements or slugs 208 which form integral inserts in the hub 206. These slugs or inserts 208 extend axially into a radial air gap 210 which is formed between circumferentially spaced stator elements or teeth 216 on a stator portion 218 which is not actively excited.

The rotor 202 is supported by a central support shaft 220 which is rotatably mounted by means of bearings not shown on a fixed support shaft 222. It will be noted that, in accordance with this invention, the print wheel 204 is not connected to the rotor 202 by means of the shaft 220 but rather is directly connected to the rotor hub portion 206. It will also be understood that the rotor 202 and the print wheel 204 are not readily removable in one piece from the stator of the motor 200. In this regard, it will be noted that the housing 224 including a first section 226 and a second section 228 encloses a portion of the hub 206. However, the print wheel 204 may be readily removed from the end of the hub portion 206 without removing the rotor elements 208 from the radial air gap 210.

The radial air gap stepper motor 200 shown in FIGS. 8–10 includes the same high performance features as the axial air gap stepper motor described with reference to FIGS. 1–7. In this regard, it will be noted that the rotor elements 208 are always interposed between the stator elements 212 and 216 which form the air gap 210. Furthermore, the hub portion 206 may comprise a relatively lightweight non-magnetic material such as plastic so as to reduce the mass of the rotor 202. Furthermore, the rotor elements 208 are symmetric with respect to the air gap, i.e., they have the same appearance facing outwardly toward the stator portion 218 as they have facing inwardly toward the stator portion 214. All of this permits the motor to achieve high performance even though the stator is excited on only one side of the air gap 210.

It will also be seen, with reference to FIGS. 8 and 9, that excitation of the stator portion 214 by energizing windings 230 without actively exciting the stator portion 218 with comparable windings does achieve certain topological advantages. In this connection, it will be understood that the use of windings on the stator portion 218 would substantially expand the diameter of the radial air gap motor 200 so as to limit the accessability of the removable print wheel 204. Furthermore, as discussed with respect to the axial air gap motor, such additional windings would increase the weight of the radial air gap motor and thereby increase the mass which must be carried by a carriage 22. A more detailed discussion of the performance advantages of a radial air gap motor such as that described in FIGS. 8–10 may be found in the aforesaid copending application which is incorporated herein by reference as if set forth in full.

Although particular rotary stepper motors have been shown and described, it is understood that other stepper motors may be utilized. For example, a stepper motor having two excited stator portions may be utilized which still incorporates many important aspects of the invention. In this connection, reference is made to a book entitled, Theory and Applications of Step Motors, by Benjamin C. Kuo, West Publishing Co., 1974 for a description of various types of stepper motors including details for stepper motor design, which book is incorporated herein by reference as if set forth in full. It will also be understood that the invention in its broadest aspects may be embodied in a motor which is not of the stepper type.

The invention has been described in connection with a serial impact printer in the form of a typewriter. It will of course be understood that the invention may be incorporated in other serial impact printers.

As utilized herein, the words "directly connected" with reference to the print wheel or character array and the rotor, refer to or define a connection which is made without benefit of a shaft extending outwardly from the rotor to the print wheel or the character array. The words "integral" with or "integrally attached" refer to a permanent attachment or connection which is not intended to be disturbed or, at least, cannot be disturbed and then reinstated. For example, the rivets shown in FIG. 2, 4 and 5 make a permanent connection which is not intended to be disturbed. The word "coaxial" as used herein, refers to a relationship wherein members have a common axis and overlap along that axis as in the sense of a coaxial cable. The words "longitudinal flux leakage" generally refer to a flux path through the rotor and between rotor elements which is generally parallel, with the direction of motion of the rotor elements at any point on the circular path traveled by the rotor elements.

Although a particular embodiment of the invention has been shown and described, it will be appreciated that other embodiments and modifications will occur to those of ordinary skill in the art and such embodiments and modifications will fall within the true spirit and scope of the invention as set forth in the appended claims.

What is claimed is:

1. A printing apparatus comprising:
   a rotary character array including a plurality of character elements located at a plurality of circumferentially spaced print positions radially displaced with respect to the axis of rotation;
   a drive apparatus for said character array comprising a rotary stepper motor including:
      a stator having a plurality of circumferentially spaced stator elements comprising magnetic material, said stator comprising a first stator portion and a second stator portion axially displaced with respect to said first portion so as to form an axial air gap;
      energizing means for selectively energizing said magnetic stator elements, and
      a rotor including a hub portion carrying a plurality of circumferentially spaced rotor elements comprising magnetic material inserts in said hub portion radially displaced from said axis of rotation and juxtaposed to and spaced from said magnetic stator elements; said rotor elements adapted to close various flux paths between said stator elements in response to selective energization of said stator elements by said energizing means; and
   a platen;
   said character array being attached directly to said rotor for rotating said character array and said character array comprising a plurality of spokes extending and being spaced radially outwardly from said hub portion and said rotor elements so as to be juxtaposed to the platen, said character elements being located on said spokes, wherein the axial thickness of said character elements does not substantially exceed the axial thickness of said hub portion including said inserts, the apparatus further comprising support means for said hub portion, said support means being axially retractable so as to permit removal of said rotor and said character array from said axial air gap without altering the dimensions thereof.

2. The printing apparatus of claim 1 wherein said hub portion comprises a central opening and said support means includes a shaft having a cylindrical surface and a chamfered surface adapted to cooperate with said opening for centering said hub portion on said cylindrical surface.

3. The printing apparatus of claim 1 wherein said hub portion comprises a central opening and said support means includes a central support portion extending into said opening and a radially outwardly spaced clamping portion.

4. A printing apparatus comprising:
   a rotary character array including a plurality of character elements located at a plurality of circumferentially spaced print positions radially displaced with respect to the axis or rotation;
   a drive apparatus for said character array comprising a rotary stepper motor including
      a stator having a plurality of circumferentially spaced stator elements comprising magnetic material, said stator including a first stator portion and a second stator portion axially displaced with respect to said first stator portion so as to form an axial air gap,
      energizing means for selectively energizing said magnetic stator elements,
      a rotor including a plurality of circumferentially spaced rotor elements comprising magnetic material radially displaced from said axis of rotation and juxtaposed to and spaced from said magnetic stator elements in said air gap, said rotor elements adapted to close various flux paths between said stator elements in response to selective energization of said stator elements by said energizing means, and
      support means for said rotor, said support means being axially retractable so as to permit removal of said rotor from said axial air gap without altering the dimensions thereof;
   said character array being attached directly to said rotor for rotating said character array.

5. The printing apparatus of claim 4 wherein said rotor comprises a central opening and said support means includes a shaft having a cylindrical surface and a chamfered surface adapted to cooperate with said opening for centering said hub portion on said cylindrical surface.

6. The printing apparatus of claim 4 wherein said rotor comprises a hub portion and said character array comprises a plurality of spokes extending radially outwardly from said hub portion and said rotor elements, said character elements being located on said spokes and said rotor elements being located on said hub portion.

7. The printing apparatus of claim 6 wherein said rotor elements comprise inserts in said hub portion.

8. The printing apparatus of claim 7 wherein said hub portion comprises a central opening and said support means includes a support portion extending into said opening and a radially outwardly spaced clamping portion.

* * * * *